Figure 1:
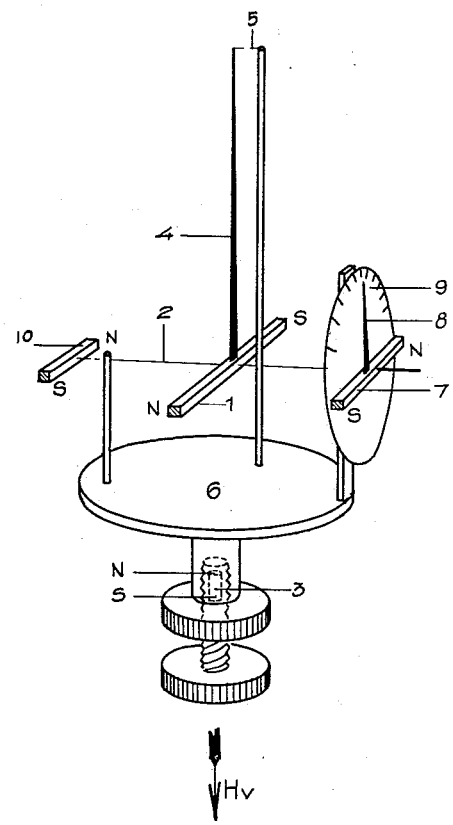

March 6, 1962  A. BREEN  3,024,412
MAGNETIC MEASURING INSTRUMENT
Filed Sept. 10, 1958  2 Sheets-Sheet 1

Inventor
A. Breen
By Glascock Downing Seebold
Attys.

March 6, 1962 A. BREEN 3,024,412
MAGNETIC MEASURING INSTRUMENT
Filed Sept. 10, 1958 2 Sheets-Sheet 2
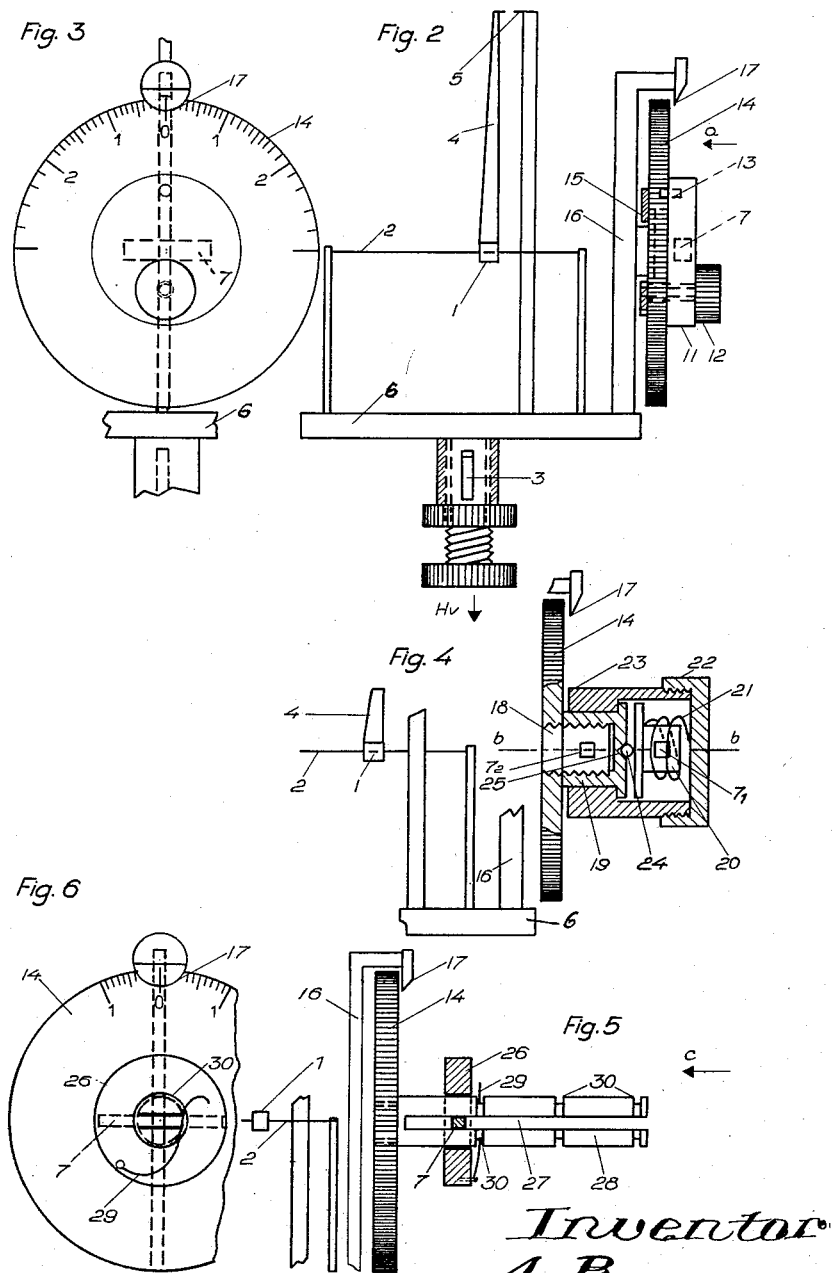
Inventor
A. Breen
By Glasworth Downing Seebold
Attys

United States Patent Office 3,024,412
Patented Mar. 6, 1962

3,024,412
MAGNETIC MEASURING INSTRUMENT
Arne Breen, Petter Lies vei 8, Trondheim, Norway
Filed Sept. 10, 1958, Ser. No. 760,167
Claims priority, application Norway Sept. 24, 1957
4 Claims. (Cl. 324—48)

This invention relates to a measuring instrument and, more especially, to instruments of the type employed for measuring anomalies in the earth's magnetic field.

Devices are known of the general type of the present invention where a horizontal primary magnet pivoted for movement in a vertical plane is compensated by one or more auxiliary magnets to satisfy a standard set of conditions and a rotatable secondary magnet operating in a plane parallel to the plane of the primary magnet is used to determine the magnetic anomalies by a pointer mounted on the secondary magnet against a scale mounted on the instrument.

These known devices must be frequently recompensated because of varying conditions under which they are used and the computations required after reading the scale will be different under different conditions. If the instrument is designed to measure strong anomalies it may well be that small anomalies will be scarcely discernable and if designed to give a reading for small anomalies the pointer will require a longer scale.

It is an object of the present invention to provide an instrument of this kind that can be set to standard conditions and in use can be changed for use to measure strong or weak anomalies without requiring to be recompensated.

Other and further objects and advantages of this invention will become apparent from the following specification taken with the accompanying drawings in which like characters of reference refer to like elements in the several views, and in which:

FIGURE 1 is a diagrammatic view of an instrument to determine magnetic anomalies, FIGURES 2 and 3 show diagrammatically an instrument for determining magnetic anomalies having a replaceable measuring magnet, FIGURE 4 shows a similar instrument having two measuring magnets that can be rotated with respect to each other to change the range of the instrument, and FIGURES 5 and 6 show a similar instrument in which the measuring magnet is adjustable axially of its axis of rotation.

Referring to this drawing, FIGURE 1:

1 is a magnetic needle mounted by a horizontal wire 2, to swing in a vertical plane. On a place where the magnetic field may be expected to be normal the magnetic needle 1 is brought in a horizontal position by a suitable setting of the compensating magnet 3. The horizontal position of the magnetic needle 1 is controlled by the magnetic needle's pointer 4 in such a way that the end of this pointer when the magnetic needle is in the correct position is just opposite to the bar-mark 5 which through the instrument's base 6 has a fixed position to the wire's 2 suspension points. The torque which the magnetic anomalies exert (act) on the magnetic needle is compensated by turning the adjustable magnet 7 a suitable angle from its horizontal position. Anomalies in the vertical component of the earth's magnetic field are then readable on the scale 9 by help of the pointer 8 on the magnet 7.

By strong anomalies it may happen that the instrument's measuring range will be too small. In order to use the instrument also in this case one has hitherto solved the problem by a new setting of the magnet 3, or by the setting of an auxiliary magnet 10. The positions of these magnets must then be readable on suitable scales.

If the instrument has to cover a great measuring range said magnets must be made comparatively strong and the described method has the disadvantage that difficulties arising from instabilities may occur. This is due to the fact that the positions of said magnets 3, 10 relatively to the magnet needle 1 will be very critical.

The setting of said magnets can only be reproduced to a certain extent. When again going over to measure smaller anomalies the readings will therefore have an error equal to the error made in setting the magnets.

The object of the present invention is to overcome the difficulties above mentioned. With this object in view the maximal torque exerted (acted) on the instrument's magnetic needle by the adjustable magnet 7, when this magnet is turned 96° from its horizontal position, is changeable, preferably by changing the moment of the instrument's adjustable magnet 7. According to the invention this may be obtained in several ways.

Referring to these drawings, 1 is the mentioned magnetic needle mounted by a horizontal wire 2, to swing in a vertical plane. 3 is the compensating magnet which by a suitable setting brings the magnetic needle in a horizontal position. 5 is the bar-mark for the magnetic needle's pointer 4. 6 is the instrument's base. 7 is the adjustable measuring magnet which by turning compensates the torque which the magnetic anomalies exert on the magnetic needle.

In the embodiment according to FIGURES 2 and 3 the instrument is adapted for exchanging said measuring magnet 7 in order to change the moment of the measuring magnet. The used measuring magnet 7 is fitted to an exchangeable disc 11 which by a screw 12 and a tap 13 is fastened in a fixed position to the scale-disc 14 which is to be turned together with said measuring magnet 7, as the scale-disc is mounted in the bearing 15 on the column 16. On the top of this column is fixed the pointer 17 which by the scale 14 indicates the turning of said measuring magnet 7.

In the embodiment according to FIGURE 4, the instrument permits two measuring ranges, as the measuring magnet 7 consists of two magnets $7_1$ and $7_2$ to be turned on a common axis b—b and adapted to be brought in two different positions relatively to each other, in one of which positions the magnetic moments of the two magnets $7_1$ and $7_2$ are added, and in the other of which position the magnetic moments of the magnets $7_1$ and $7_2$ are subtracted. This is obtained thereby that the one magnet $7_2$ by help of a screw 18 and a nut 19 is fastened to the scale-disc 14. The other magnet $7_1$ is mounted to a member 20 which by help of a spring 21 is connected to a knob 22 which is screwed on a turntable sleeve 23. By turning the knob 22 the two magnets $7_1$ and $7_2$ can be brought in said two different positions relatively to each other, as a pin 24 fastened to said member 20 fits in a slot 25 on said nut 19. The scale-disc 14 is to be turned on the column 16 as in the foregoing embodiment.

In the embodiment according to FIGURES 5 and 6 the distance between said measuring magnet 7 and the magnet needle 1 is to be varied, as the measuring magnet 7 is fastened to a ring 26 and adapted to be moved in a longitudinal slot 27 on the rod 28 which is fastened to the scale-disc 14. 29 is a spring fastened to said ring 26, said spring fits into slots 30 on the rod 28 whereby the ring 26 with the magnet 7 by help of said spring can be fixed on the rod 28 in a suitable distance from the magnet needle 1. The scale-disc 14 is to be turned on the column 16 as in the foregoing embodiments.

Errors due to inaccuracies in reading the position of the adjustable magnet 7 will be proportional to the instrument's measuring range. The percentual error by determining the magnetic anomalies will therefore to a certain extent be constant. This will normally correspond to what is wanted by measuring magnetic anomalies. A new setting of the magnet 3 will seldom be necessary and therefore this magnet may be held in a firm position. The design of the instrument is very simple.

What I claim is:

1. A magnetic measuring instrument for measuring anomalies in the earth's magnetic field comprising a first magnet mounted for pivoting on a horizontal axis, a pointer on said first magnet, a bar mark to indicate in conjunction with said pointer when said first magnet is in horizontal position, a compensating magnet adjustably mounted below said first magnet whereby said first magnet may be compensated with respect to a standard operating condition, and a measuring means including at least one measuring magnet mounted for pivotal movement about a horizontal axis lying in the plane of the axis of rotation of said first magnet and indicator means to indicate the angular displacement of said measuring magnet required to return said pointer on said first magnet to said bar mark under the conditions to be measured.

2. The device of claim 1, in which said measuring means comprises two magnets that may be rotated with respect to each other to vary their combined magnetic field whereby the measuring means may be adapted for use under widely varying conditions.

3. The device of claim 1, in which said measuring magnet is so constructed and arranged as to be removable for replacement by a measuring magnet of different magnetic characteristics.

4. The device of claim 1, in which said measuring magnet is mounted for sliding movement along the axis of pivoting of said measuring means to vary the maximal torque which the measuring magnet exerts on said first magnet.

References Cited in the file of this patent

FOREIGN PATENTS 319,798  Great Britain _____ Sept. 26, 1929